United States Patent
Guerra et al.

(10) Patent No.: US 7,174,297 B2
(45) Date of Patent: Feb. 6, 2007

(54) SYSTEM, METHOD AND COMPUTER PROGRAM PRODUCT FOR A DYNAMICALLY CONFIGURABLE VOICE PORTAL

(75) Inventors: Lisa M. Guerra, Los Altos, CA (US); John E. Fitzpatrick, Sunnyvale, CA (US); Mark D. Womack, San Jose, CA (US)

(73) Assignee: BeVocal, Inc., Mountain View, CA (US)

(*) Notice: Subject to any disclaimer, the term of this patent is extended or adjusted under 35 U.S.C. 154(b) by 122 days.

(21) Appl. No.: 09/802,662

(22) Filed: Mar. 9, 2001

(65) Prior Publication Data

US 2002/0188451 A1 Dec. 12, 2002

(51) Int. Cl.
*G10L 15/22* (2006.01)
*G10L 17/00* (2006.01)

(52) U.S. Cl. .............. 704/270.1; 704/274; 704/275

(58) Field of Classification Search ........ 704/270, 704/270.1, 275, 246; 379/88.01, 88.04, 88.17, 379/45, 47
See application file for complete search history.

(56) References Cited

U.S. PATENT DOCUMENTS

| | | | |
|---|---|---|---|
| 5,592,538 A | 1/1997 | Kosowsky et al. | |
| 5,613,036 A | 3/1997 | Strong | |
| 5,819,220 A | 10/1998 | Sarukkai et al. | |
| 5,953,701 A * | 9/1999 | Neti et al. | 704/254 |
| 6,154,128 A * | 11/2000 | Wookey et al. | 340/506 |
| 6,400,806 B1 * | 6/2002 | Uppaluru | 379/88.02 |
| 6,424,935 B1 * | 7/2002 | Taylor | 704/10 |
| 6,442,241 B1 * | 8/2002 | Tsumpes | 379/45 |
| 6,510,417 B1 * | 1/2003 | Woods et al. | 704/275 |
| 6,665,644 B1 * | 12/2003 | Kanevsky et al. | 704/275 |
| 6,789,065 B2 * | 9/2004 | Berner et al. | 704/275 |
| 6,813,342 B1 * | 11/2004 | Chu et al. | 379/88.01 |
| 6,823,054 B1 * | 11/2004 | Suhm et al. | 379/134 |
| 7,003,079 B1 * | 2/2006 | McCarthy et al. | 379/32.01 |
| 7,016,843 B2 * | 3/2006 | Fitzpatrick et al. | 704/270.1 |
| 7,024,364 B2 * | 4/2006 | Guerra et al. | 704/270 |
| 7,069,513 B2 * | 6/2006 | Damiba | 715/738 |

FOREIGN PATENT DOCUMENTS

| | | |
|---|---|---|
| JP | 11249867 | 9/1999 |
| WO | WO0058942 | 10/2000 |

* cited by examiner

*Primary Examiner*—Martin Lerner
(74) *Attorney, Agent, or Firm*—Zilka-Kotab, PC

(57) ABSTRACT

A system, method and computer program product are disclosed for dynamically configuring a speech recognition portal. A session with a user is conducted utilizing a speech recognition portal which provides access to a network during the session. Utterances are received from the user during the session via the speech recognition portal. A speech recognition process is performed on the utterances to interpret the utterances. During the session, one or more aspects of the speech recognition portal are dynamically configured.

16 Claims, 4 Drawing Sheets

SYSTEM, METHOD AND COMPUTER PROGRAM PRODUCT FOR A DYNAMICALLY CONFIGURABLE VOICE PORTAL

FIELD OF THE INVENTION

This invention relates to speech recognition systems, and more particularly, relates to large-scale speech recognition systems.

BACKGROUND OF THE INVENTION

Automatic speech recognition (ASR) systems provide means for human beings to interface with communication equipment, computers and other machines in a mode of communication which is most natural and convenient to humans. One known approach to automatic speech recognition of isolated words involves the following: periodically sampling a bandpass filtered (BPF) audio speech input signal; monitoring the sampled signals for power level to determine the beginning and the termination (endpoints) of the isolated words; creating from the sampled signals frames of data and then processing the data to convert them to processed frames of parametric values which are more suitable for speech processing; storing a plurality of templates (each template is a plurality of previously created processed frames of parametric values representing a word, which when taken together form the reference vocabulary of the automatic speech recognizer); and comparing the processed frames of speech with the templates in accordance with a predetermined algorithm to find the best time alignment path or match between a given template and the spoken word.

ASR techniques commonly use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include subgrammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

ASR systems have greatly improved in recent years as better algorithms and acoustic models are developed, and as more computer power can be brought to bear on the task. An ASR system running on an inexpensive home or office computer with a good microphone can take free-form dictation, as long as it has been pre-trained for the speaker's voice. Over the phone, and with no speaker training, a speech recognition system needs to be given a set of speech grammars that tell it what words and phrases it should expect. With these constraints a surprisingly large set possible utterances can be recognized (e.g., a particular mutual fund name out of thousands). Recognition over mobile phones in noisy environments does require more tightly pruned and carefully crafted speech grammars, however. Today there are many commercial uses of ASR in dozens of languages, and in areas as disparate as voice portals, finance, banking, telecommunications, and brokerages.

Advances are also being made in speech synthesis, or text-to-speech (TTS). Many TTS systems still sound like "robots" and can be hard to listen to or even at times incomprehensible. However, waveform concatenation speech synthesis is frequently deployed where speech is not completely generated from scratch, but is assembled from libraries of pre-recorded waveforms.

In a standard speech recognition/synthesis system, a database of utterances is maintained for administering a predetermined service. In one example of operation, a user may utilize a telecommunication network to communicate utterances to the system. In response to such communication, the utterances are recognized utilizing speech recognition, and processing takes place utilizing the recognized utterances. Thereafter, synthesized speech is outputted in accordance with the processing. In one particular application, a user may verbally communicate a street address to the speech recognition system, and driving directions may be returned utilizing synthesized speech.

SUMMARY OF THE INVENTION

A system, method and computer program product are disclosed for dynamically configuring a speech recognition portal. A session with a user is conducted utilizing a speech recognition portal which provides access to a network during the session. Utterances are received from the user during the session via the speech recognition portal. A speech recognition process is performed on the utterances to interpret the utterances. During the session, one or more aspects of the speech recognition portal are dynamically configured.

In an embodiment of the present invention, the configuration of the speech recognition portal may be monitored during the session to ascertain user preferences of the aspects of the speech recognition portal so that the user preferences may then be stored in a memory. As a further option, the user preferences may then be retrieved from the memory upon initiation of a subsequent session with the user utilizing the speech recognition portal so that at least one aspect of the speech recognition portal can be initially configured based on the retrieved user preferences.

In one embodiment of the present invention, the aspects of the speech recognition portal may include a set of applications presented in the speech recognition portal during the session. In another embodiment, the aspects of the speech recognition portal may include a set of commands available for use in the speech recognition portal. In a further embodiment, the aspects of the speech recognition portal may include a set of verbal prompts used in the speech recognition portal.

In one aspect of the present invention, the one or more aspects of the speech recognition portal may be dynamically configured based on at least one of the interpreted utterances of the user. In a further aspect, the one or more aspects of the speech recognition portal may be dynamically configured based on a credit card account number of the user. In an additional aspect, the one or more aspects of the speech recognition portal may be dynamically configured based on stock purchases by the user. In yet another aspect, the one or more aspects of the speech recognition portal may be dynamically configured based on characteristics of the user. In one embodiment of the present invention, one or more back end processes in communication with the speech recognition portal via the network may also be dynamically configured.

In one aspect of the present invention, the utterances may include information about the locale of the user and so that the aspects of the speech recognition portal can be dynamically configured based on the locale of the user. In another aspect, information about a gender of the user may be ascertained from the utterances so that the aspects of the speech recognition portal can be dynamically configured based on the ascertained gender of the user. In a further aspect, a profile may be associated with the user so that the aspects of the speech recognition portal can be dynamically configured upon change of the profile by a third party authorized to change the profile. In yet another aspect, a graphical interface may also be presented to the user utilizing the network during the session to allow the user to input information via the graphical interface so that the aspects of the speech recognition portal can be dynamically configured based on the information input by the user via the graphical interface.

DETAILED DESCRIPTION

Figure 1:
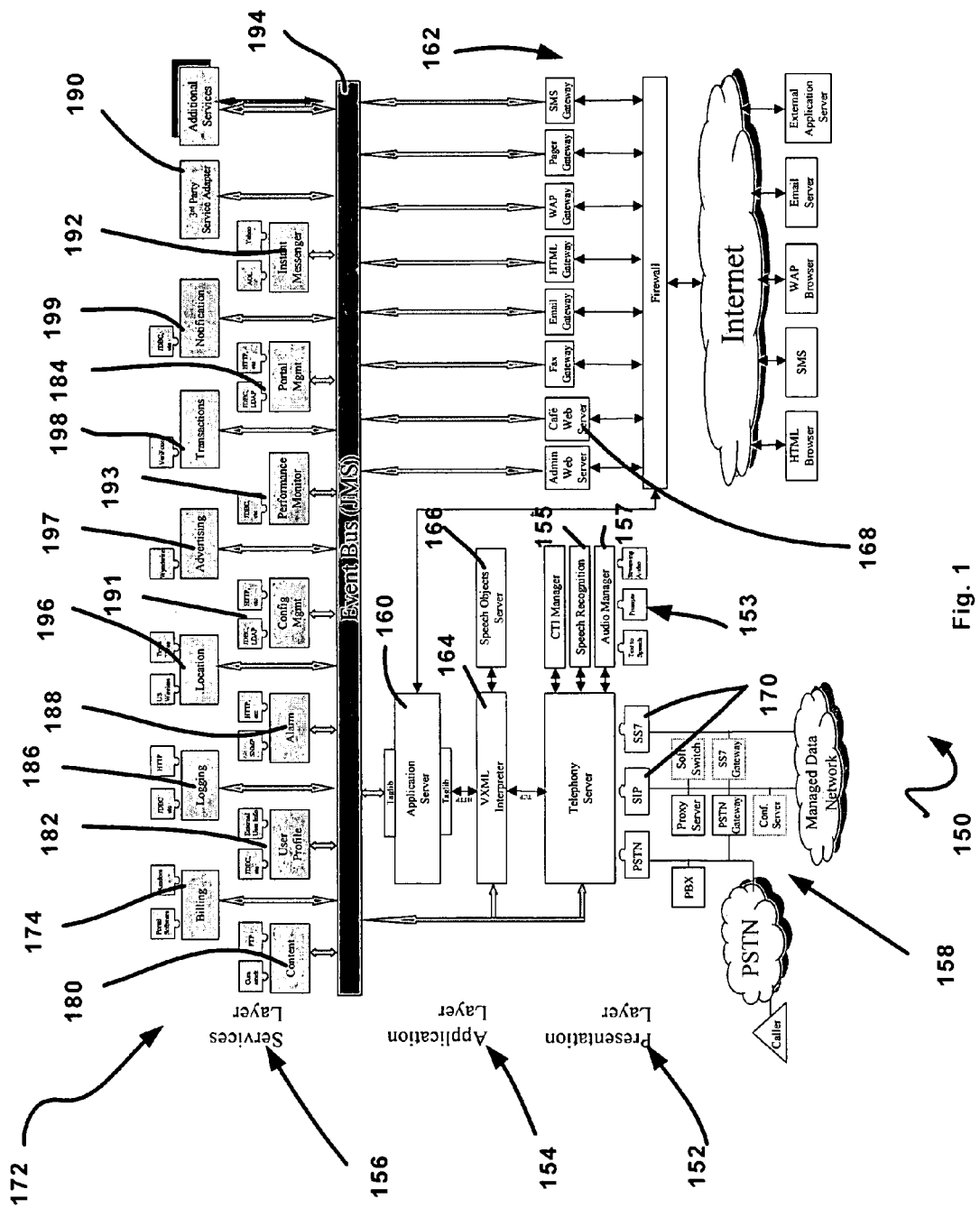
FIG. 1 illustrates one exemplary platform on which an embodiment of the present invention may be implemented.

FIG. 1 illustrates an exemplary platform 150 on which the present invention may be implemented. The present platform 150 is capable of supporting voice applications that provide unique business services. Such voice applications may be adapted for consumer services or internal applications for employee productivity.

The present platform of FIG. 1 provides an end-to-end solution that manages a presentation layer 152, application logic 154, information access services 156, and telecom infrastructure 159. With the instant platform, customers can build complex voice applications through a suite of customized applications and a rich development tool set on an application server 160. The present platform 150 is capable of deploying applications in a reliable, scalable manner, and maintaining the entire system through monitoring tools.

The present platform 150 is multi-modal in that it facilitates information delivery via multiple mechanisms 162, i.e. Voice, Wireless Application Protocol (WAP), Hypertext Mark-up Language (HTML), Facsimile, Electronic Mail, Pager, and Short Message Service (SMS). It further includes a VoiceXML interpreter 164 that is fully compliant with the VoiceXML 1.0 specification, written entirely in Java®, and supports Nuance® SpeechObjects 166.

Yet another feature of the present platform 150 is its modular architecture, enabling "plug-and-play" capabilities. Still yet, the instant platform 150 is extensible in that developers can create their own custom services to extend the platform 150. For further versatility, Java® based components are supported that enable rapid development, reliability, and portability. Another web server 168 supports a web-based development environment that provides a comprehensive set of tools and resources which developers may need to create their own innovative speech applications.

Support for SIP and SS7 (Signaling System 7) is also provided. Backend Services 172 are also included that provide value added functionality such as content management 180 and user profile management 182. Still yet, there is support for external billing engines 174 and integration of leading edge technologies from Nuance®, Oracle®, Cisco®, Natural Microsystems®, and Sun Microsystems®.

More information will now be set forth regarding the application layer 154, presentation layer 152, and services layer 156.

Application Layer (154)

The application layer 154 provides a set of reusable application components as well as the software engine for their execution. Through this layer, applications benefit from a reliable, scalable, and high performing operating environment. The application server 160 automatically handles lower level details such as system mamagement, communications, monitoring, scheduling, logging, and load balancing. Some optional features associated with each of the various components of the application layer 154 will now be set forth.

Application Server (160)
 A high performance web/JSP server that hosts the business and presentation logic of applications.
 High performance, load balanced, with fail over.
 Contains reusable application components and ready to use applications.
 Hosts Java Servlets and JSP's for custom applications.
 Provides easy to use taglib access to platform services.

VXML Interpreter (164)
 Executes VXML applications
 VXML 1.0 compliant
 Can execute applications hosted on either side of the firewall.
 Extensions for easy access to system services such as billing.
 Extensible—allows installation of custom VXML tag libraries and speech objects.
 Provides access to SpeechObjects 166 from VXML.
 Integrated with debugging and monitoring tools.
 Written in Java®.

Speech Objects Server (166)
 Hosts SpeechObjects based components.
 Provides a platform for running SpeechObjects based applications.
 Contains a rich library of reusable SpeechObjects.

Services Layer (156)

The services layer 156 simplifies the development of voice applications by providing access to modular value-added services. These backend modules deliver a complete set of functionality, and handle low level processing such as error checking. Examples of services include the content 180, user profile 182, billing 174, and portal management 184 services. By this design, developers can create high performing, enterprise applications without complex programming. Some optional features associated with each of the various components of the services layer 156 will now be set forth.

Content (180)
 Manages content feeds and databases such as weather reports, stock quotes, and sports.
 Ensures content is received and processed appropriately.
 Provides content only upon authenticated request.
 Communicates with logging service 186 to track content usage for auditing purposes.
 Supports multiple, redundant content feeds with automatic, fail over.
 Sends alarms through alarm service 188.

User Profile (182)
  Manages user database
  Can connect to a 3$^{rd}$ party user database 190. For example, if a customer wants to leverage his/her own user database, this service will manage the connection to the external user database.
  Provides user information upon authenticated request.

Alarm (188)
  Provides a simple, uniform way for system components to report a wide variety of alarms.
  Allows for notification (Simple Network Management Protocol (SNMP), telephone, electronic mail, pager, facsimile, SMS, WAP push, etc.) based on alarm conditions.
  Allows for alarm management (assignment, status tracking, etc) and integration with trouble ticketing and/or helpdesk systems.
  Allows for integration of alarms into customer premise environments.
  Allows customer developed applications to be managed.

Configuration Management (191)
  Maintains the configuration of the entire system.

Performance Monitor (193)
  Provides real time monitoring of entire system such as number of simultaneous users per customer, number of users in a given application, and the uptime of the system.
  Enables customers to determine performance of system at any instance.

Portal Management (184)
  The portal management service 184 maintains information on the configuration of each voice portal and enables customers to electronically administer their voice portal through the administration web site.
  Portals can be highly customized by choosing from multiple applications and voices. For example, a customer can configure different packages of applications i.e. a basic package consisting of 3 applications for $4.95, a deluxe package consisting of 10 applications for $9.95, and premium package consisting of any 20 applications for $14.95.

Instant Messenger (192)
  Detects when users are "on-line" and can pass messages such as new voicemails and e-mails to these users.

Billing (174)
  Provides billing infrastructure such as capturing and processing billable events, rating, and interfaces to external billing systems.

Logging (186)
  Logs all events sent over the JMS bus 194. Examples include User A of Company ABC accessed Stock Quotes, application server 160 requested driving directions from content service 180, etc.

Location (196)
  Provides geographic location of caller.
  Location service sends a request to the wireless carrier or to a location network service provider such as TimesThree® or US Wireless. The network provider responds with the geographic location (accurate within 75 meters) of the cell phone caller.

Advertising (197)
  Administers the insertion of advertisements within each call. The advertising service can deliver targeted ads based on user profile information.
  Interfaces to external advertising services such as Wyndwire® are provided.

Transactions (198)
  Provides transaction infrastructure such as shopping cart, tax and shipping calculations, and interfaces to external payment systems.

Notification (199)
  Provides external and internal notifications based on a timer or on external events such as stock price movements. For example, a user can request that he/she receive a telephone call every day at 8 a.m.
  Services can request that they receive a notification to perform an action at a pre-determined time. For example, the content service 180 can request that it receive an instruction every night to archive old content.

3$^{rd}$ Party Service Adapter (190)
  Enables 3$^{rd}$ parties to develop and use their own external services. For instance, if a customer wants to leverage a proprietary system, the 3$^{rd}$ party service adapter can enable it as a service that is available to applications.

Presentation Layer (152)
  The presentation layer 152 provides the mechanism for communicating with the end user. While the application layer 154 manages the application logic, the presentation layer 152 translates the core logic into a medium that a user's device can understand. Thus, the presentation layer 152 enables multi-modal support. For instance, end users can interact with the platform through a telephone, WAP session, HTML session, pager, SMS, facsimile, and electronic mail. Furthermore, as new "touchpoints" emerge, additional modules can seamlessly be integrated into the presentation layer 152 to support them.

Telephony Server (158)
  The telephony server 158 provides the interface between the telephony world, both Voice over Internet Protocol (VoIP) and Public Switched Telephone Network (PSTN), and the applications running on the platform. It also provides the interface to speech recognition and synthesis engines 153. Through the telephony server 158, one can interface to other 3$^{rd}$ party application servers 190 such as unified messaging and conferencing server. The telephony server 158 connects to the telephony switches and "handles" the phone call.
  Features of the telephony server 158 include:
  Mission critical reliability.
  Suite of operations and maintenance tools.
  Telephony connectivity via ISDN/T1/E1, SIP and SS7 protocols.
  DSP-based telephony boards offload the host, providing real-time echo cancellation, DTMF & call progress detection, and audio compression/decompression.

Speech Recognition Server (155)
  The speech recognition server 155 performs speech recognition on real time voice streams from the telephony server 158. The speech recognition server 155 may support the following features:
  Carrier grade scalability & reliability
  Large vocabulary size Industry leading speaker independent recognition accuracy Recognition enhancements for wireless and hands free callers Dynamic grammar support—grammars can be added during run time.

Multi-language support

Barge in—enables users to interrupt voice applications. For example, if a user hears "Please say a name of a football team that you," the user can interject by saying "Miami Dolphins" before the system finishes.

Speech objects provide easy to use reusable components

"On the fly" grammar updates

Speaker verification

Audio Manager (157)

Manages the prompt server, text-to-speech server, and streaming audio.

Prompt Server (153)

The Prompt server is responsible for caching and managing pre-recorded audio files for a pool of telephony servers.

Text-to-Speech Server (153)

When pre-recorded prompts are unavailable, the text-to-speech server is responsible for transforming text input into audio output that can be streamed to callers on the telephony server 158. The use of the TTS server offloads the telephony server 158 and allows pools of TTS resources to be shared across several telephony servers. Features include:

Support for industry leading technologies such as SpeechWorks® Speechify® and L&H RealSpeak®.

Standard Application Program Interface (API) for integration of other TTS engines.

Streaming Audio

The streaming audio server enables static and dynamic audio files to be played to the caller. For instance, a one minute audio news feed would be handled by the streaming audio server.

Support for standard static file formats such as WAV and MP3

Support for streaming (dynamic) file formats such as Real Audio® and Windows® Media®.

PSTN Connectivity

Support for standard telephony protocols like ISDN, E&M WinkStart®, and various flavors of E1 allow the telephony server 158 to connect to a PBX or local central office.

SIP Connectivity

The platform supports telephony signaling via the Session Initiation Protocol (SIP). The SIP signaling is independent of the audio stream, which is typically provided as a G.711 RTP stream. The use of a SIP enabled network can be used to provide many powerful features including:

Flexible call routing

Call forwarding

Blind & supervised transfers

Location/presence services

Interoperable with SIP compliant devices such as soft switches

Direct connectivity to SIP enabled carriers and networks

Connection to SS7 and standard telephony networks (via gateways)

Admin Web Server

Serves as the primary interface for customers.

Enables portal management services and provides billing and simple reporting information. It also permits customers to enter problem ticket orders, modify application content such as advertisements, and perform other value added functions.

Consists of a website with backend logic tied to the services and application layers. Access to the site is limited to those with a valid user id and password and to those coming from a registered IP address. Once logged in, customers are presented with a homepage that provides access to all available customer resources.

Other (168)

Web-based development environment that provides all the tools and resources developers need to create their own speech applications.

Provides a VoiceXML Interpreter that is:

Compliant with the VoiceXML 1.0 specification.

Compatible with compelling, location-relevant SpeechObjects—including grammars for nationwide US street addresses.

Provides unique tools that are critical to speech application development such as a vocal player. The vocal player addresses usability testing by giving developers convenient access to audio files of real user interactions with their speech applications. This provides an invaluable feedback loop for improving dialogue design.

WAP, HTML, SMS, Email, Pager, and Fax Gateways

Provide access to external browsing devices.

Manage (establish, maintain, and terminate) connections to external browsing and output devices.

Encapsulate the details of communicating with external device.

Support both input and output on media where appropriate. For instance, both input from and output to WAP devices.

Reliably deliver content and notifications.

Figure 2:
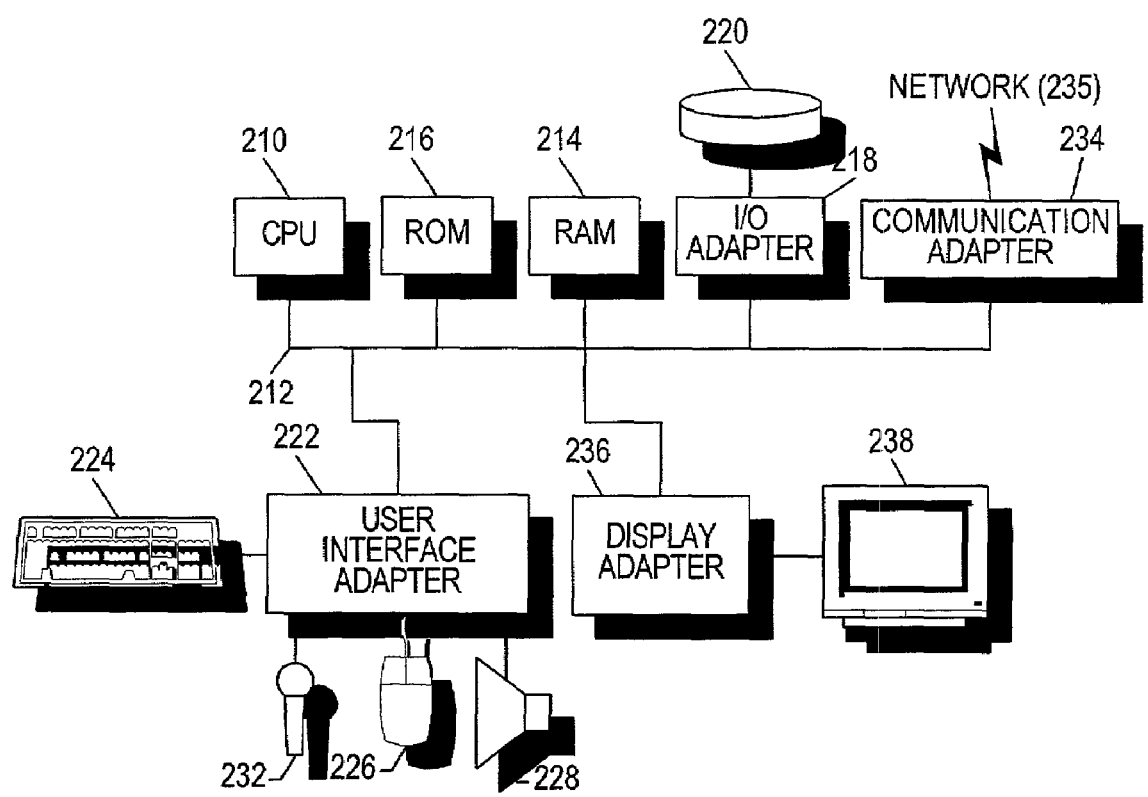
FIG. 2 shows a representative hardware environment associated with the computer systems of the platform illustrated in FIG. 1.

FIG. 2 shows a representative hardware environment associated with the various systems, i.e. computers, servers, etc., of FIG. 1. FIG. 2 illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

Figure 3:
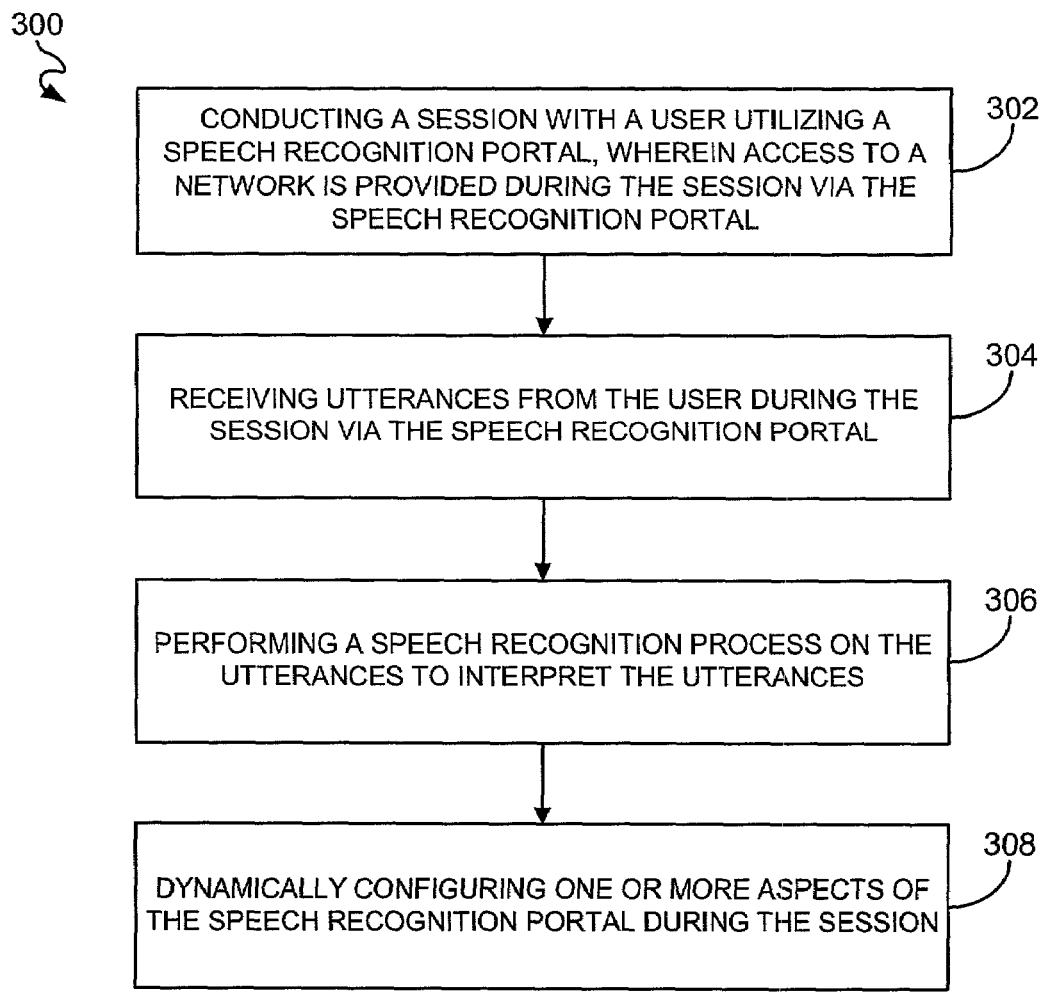
FIG. 3 is a flowchart for a process for dynamically configuring a speech recognition portal in accordance with an embodiment of the present invention.

FIG. 3 is a flowchart for a process 300 for dynamically configuring a speech recognition portal (also known as a "voice portal" or "vortal") in accordance with an embodiment of the present invention. In operation 302, a session with a user is conducted utilizing a speech recognition portal which provides access to a network during the session. Utterances are received from the user during the session via the speech recognition portal in operation 304. A speech recognition process is performed on the utterances in operation 306 to interpret the utterances. During the session in operation 308, one or more aspects of the speech recognition portal are dynamically configured.

In an embodiment of the present invention, the configuration of the speech recognition portal may be monitored during the session to ascertain user preferences of the aspects of the speech recognition portal so that the user preferences may then be stored in a memory. As a further option, the user preferences may then be retrieved from the memory upon initiation of a subsequent session with the user utilizing the speech recognition portal so that at least one aspect of the speech recognition portal can be initially configured based on the retrieved user preferences.

In one embodiment of the present invention, the aspects of the speech recognition portal may include a set of applications presented in the speech recognition portal during the session. In another embodiment, the aspects of the speech recognition portal may include a set of commands available for use in the speech recognition portal. In a further embodiment, the aspects of the speech recognition portal may include a set of verbal prompts used in the speech recognition portal.

In one aspect of the present invention, the one or more aspects of the speech recognition portal may be dynamically configured based on at least one of the interpreted utterances of the user. In a further aspect, the one or more aspects of the speech recognition portal may be dynamically configured based on a credit card account number of the user. In an additional aspect, the one or more aspects of the speech recognition portal may be dynamically configured based on stock purchases by the user. In yet another aspect, the one or more aspects of the speech recognition portal may be dynamically configured based on characteristics of the user. In one embodiment of the present invention, one or more back end processes in communication with the speech recognition portal via the network may also be dynamically configured.

In one aspect of the present invention, the utterances may include information about the locale of the user and so that the aspects of the speech recognition portal can be dynamically configured based on the locale of the user. For example, the features of the speech recognition portal or the order in which applications are presented to the user may be dynamically configured based on where the user is at the time of the session.

In another aspect, information about a gender of the user may be ascertained from the utterances so that the aspects of the speech recognition portal can be dynamically configured based on the ascertained gender of the user. For example, the speech recognition portal may be dynamically configured to present a certain set of applications upon the determination that the user is a male and another set of applications when the user is determined to be a female user. This determination of the sex of the user can be accomplished using ASR techniques capable of distinguishing the sex of a speaker based on the tone, pitch, etc. of the speaker.

In a further aspect, a profile may be associated with the user so that the aspects of the speech recognition portal can be dynamically configured upon change of the profile by a third party authorized to change the profile. This ability is extremely helpful for administrators and other managers. For example, suppose the user belongs to a certain group or class that has a certain set of applications associated with the group/class. If a manager of the class feels that an additional application should be provided to the group/class, then the manager can request the additional application to the system which can then dynamically configure the speech recognition portal during sessions (including current sessions) with of each of the users included in the group/class so that the new application is presented to these users in the speech recognition portal.

In yet another aspect, a graphical interface may also be presented to the user utilizing the network during the session to allow the user to input information via the graphical interface so that the aspects of the speech recognition portal can be dynamically configured based on the information input by the user via the graphical interface. This allows a user in front of a computer connected to the Internet and accessing a web page associated with the speech recognition portal with their Internet browser to modify aspects of the speech recognition portal through the Internet browser—even while the user is using their phone to conduct a session with the speech recognition portal. The speech recognition system of the present invention may provide a plurality of voice portal applications that can be personalized based on a caller's location, delivered to any device and customized via an open development platform. Examples of various specific voice portal applications are set forth in Table 1.

TABLE 1

Nationwide Business Finder—search engine for locating businesses representing popular brands demanded by mobile consumers.
Nationwide Driving Directions—point-to-point driving directions
Worldwide Flight Information—up-to-the-minute flight information on major domestic and international carriers
Nationwide Traffic Updates—real-time traffic information for metropolitan areas
Worldwide Weather—updates and extended forecasts throughout the world
News—audio feeds providing the latest national and world headlines, as well as regular updates for business, technology, finance, sports, health and entertainment news
Sports—up-to-the-minute scores and highlights from the NFL, Major League Baseball, NHL, NBA, college football, basketball, hockey, tennis, auto racing, golf, soccer and boxing
Stock Quotes—access to major indices and all stocks on the NYSE, NASDAQ, and AMEX exchanges
Infotainment—updates on soap operas, television dramas, lottery numbers and horoscopes The dynamic configuration process 300 provides the advantages of rapid, on-the-fly customization and configuration of services, features, and user preferences for a speech recognition portal on a call-by-call basis. The following illustrative scenario provides an example of dynamic configuration a speech recognition portal:

1. A user dials a telephone to access a speech recognition portal.
2. Upon accessing the speech recognition portal, the user speaks commands to access a configuration portion of the speech recognition portal.
3. During the access to the configuration portion, the user selects additional applications to be presented to the user in the speech recognition portal. This may be accomplished, for example, by the user selecting to upgrade their service through the speech recognition portal to a higher grade or class of service—e.g., from a basic service to a premium service.
4. The system then configures the speech recognition portal to include the new applications and dynamically modifies, if necessary, any existing applications and features of the speech recognition portal to accommodate the added applications. In our upgrade illustration, the basic service may include a first set of applications while the premium service may have additional applications not included in the basic service so that the speech recognition portal is dynamically configured to present the added applications of the premium service to the user.

One embodiment of the present invention may utilize VoiceXML. VoiceXML is a Web-based markup language for representing human-computer dialogs, similar to HTML. However, while HTML assumes a graphical web browser, with display, keyboard, and mouse, VoiceXML is assumes a "voice browser" with audio output (computer-synthesized and/or recorded), and audio input (voice and/or keypad tones). VoiceXML leverages the Internet for voice application development and delivery, greatly simplifying these difficult tasks and creating new opportunities.

Figure 4:
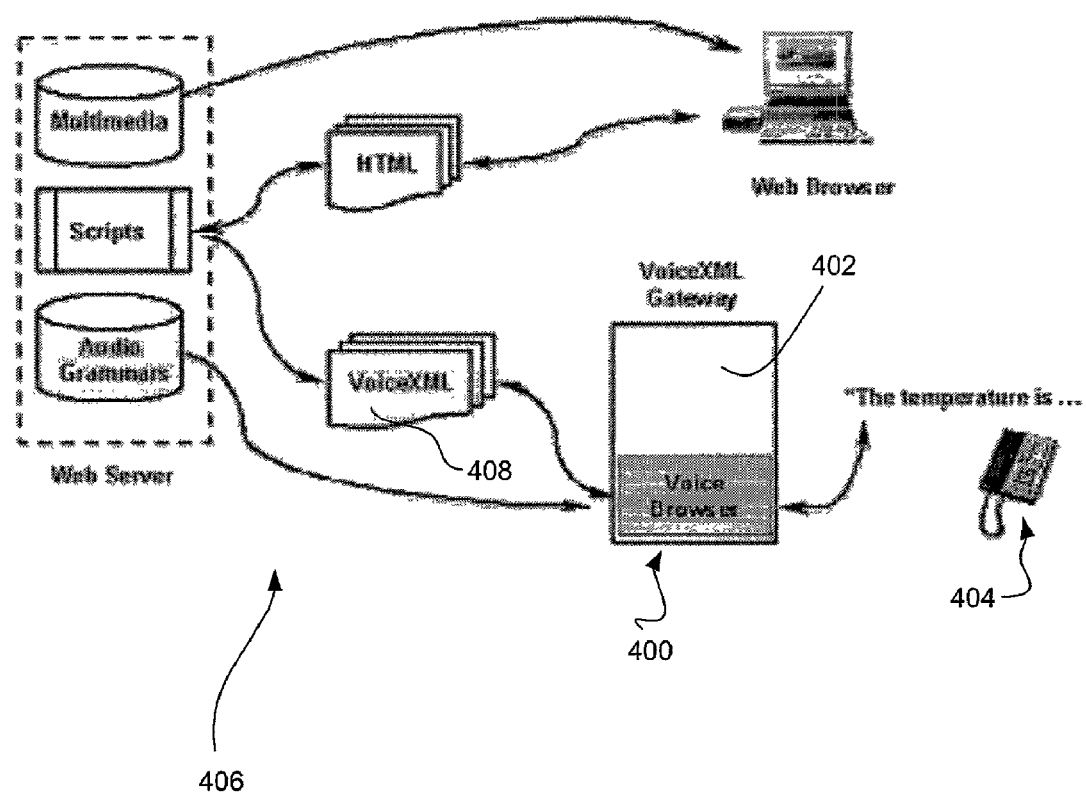
FIG. 4 is a schematic illustrating the manner in which VoiceXML functions, in accordance with one embodiment of the present invention.

FIG. 4 is a schematic illustrating the manner in which VoiceXML functions, in accordance with one embodiment of the present invention. A typical VoiceXML voice browser 400 of today runs on a specialized voice gateway node 402 that is connected both to the public switched telephone network 404 and to the Internet 406. As shown, VoiceXML 408 acts as an interface between the voice gateway node 402 and the Internet 406.

VoiceXML takes advantage of several trends:

The growth of the World-Wide Web and of its capabilities.

Improvements in computer-based speech recognition and text-to-speech synthesis.

The spread of the WWW beyond the desktop computer.

Voice application development is easier because VoiceXML is a high-level, domain-specific markup language, and because voice applications can now be constructed with plentiful, inexpensive, and powerful web application development tools.

VoiceXML is based on XML. XML is a general and highly flexible representation of any type of data, and various transformation technologies make it easy to map one XML structure to another, or to map XML into other data formats.

VoiceXML is an extensible markup language (XML) for the creation of automated speech recognition (ASR) and interactive voice response (IVR) applications. Based on the XML tag/attribute format, the VoiceXML syntax involves enclosing instructions (items) within a tag structure in the following manner:

<element_name attribute_name="attribute_value">
. . . . . contained items . . . . .
</element_name>

A VoiceXML application consists of one or more text files called documents. These document files are denoted by a ".vxml" file extension and contain the various VoiceXML instructions for the application. It is recommended that the first instruction in any document to be seen by the interpreter be the XML version tag:

<?xml version="1.0"?>

The remainder of the document's instructions should be enclosed by the vxml tag with the version attribute set equal to the version of VoiceXML being used ("1.0" in the present case) as follows:

<vxml version="1.0">

Inside of the <vxml> tag, a document is broken up into discrete dialog elements called forms.

Each form has a name and is responsible for executing some portion of the dialog. For example, you may have a form called "mainMenu" that prompts the caller to make a selection from a list of options and then recognizes the response.

A form is denoted by the use of the <form> tag and can be specified by the inclusion of the id attribute to specify the form's name. This is useful if the form is to be referenced at some other point in the application or by another application. For example, <form id="welcome"> would indicate in a VoiceXML document the beginning of the "welcome" form.

Following is a list of form items available in one specification of VoiceXML:

field items:
<field>—gathers input from the user via speech or DTMF recognition as defined by a grammar
<record>—records an audio clip from the user
<transfer>—transfers the user to another phone number
<object>—invokes a platform-specific object that may gather user input, returning the result as an ECMAScript object
<subdialog>—performs a call to another dialog or document(similar to a function call), returning the result as an ECMAScript object
control items:
<block>—encloses a sequence of statements for prompting and computation
<initial>—controls mixed-initiative interactions within a form An embodiment of the present invention may also be written using JAVA, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is oftenjust called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:
Poor performance;
Restricted user interface capabilities;
Can only produce static Web pages;
Lack of interoperability with existing applications and data; and
Inability to scale.

Sun Microsystems's Java language solves many of the client-side problems by:
Improving performance on the client side;
Enabling the creation of dynamic, real-time Web applications; and
Providing the ability to create a wide variety of user interface components.

With Java, developers can create robust User Interface (Ul) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (APT) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Transmission Control Protocol/Internet Protocol (TCP/IP) is a basic communication language or protocol of the Internet. It can also be used as a communications protocol in the private networks called Internet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite."Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX)is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII.). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

SMS (Short Message Service) is a service for sending messages of up to 160 characters to mobile phones that use Global System for Mobile (GSM) communication. GSM and SMS service is primarily available in Europe. SMS is similar to paging. However, SMS messages do not require the mobile phone to be active and within range and will be held for a number of days until the phone is active and within range. SMS messages are transmitted within the same cell or to anyone with roaming service capability. They can also be sent to digital phones from a Web site equipped with PC Link or from one digital phone to another.

On the public switched telephone network (PSTN), Signaling System 7 (SS7) is a system that puts the information required to set up and manage telephone calls in a separate network rather than within the same network that the telephone call is made on. Signaling information is in the form of digital packet. SS7 uses what is called out of band signaling, meaning that signaling (control) information travels on a separate, dedicated 56 or 64 Kbps channel rather than within the same channel as the telephone call. Historically, the signaling for a telephone call has used the same voice circuit that the telephone call traveled on (this is known as in band signaling). Using SS7, telephone calls can be set up more efficiently and with greater security. Special services such as call forwarding and wireless roaming service are easier to add and manage. SS7 is now an international telecommunications standard.

Speech or voice recognition is the ability of a machine or program to recognize and carry out voice commands or take dictation. In general, speech recognition involves the ability to match a voice pattern against a provided or acquired vocabulary. Usually, a limited vocabulary is provided with a product and the user can record additional words. More sophisticated software has the ability to accept natural speech (meaning speech as we usually speak it rather than carefully-spoken speech).

A tag is a generic term for a language element descriptor. The set of tags for a document or other unit of information is sometimes referred to as markup, a term that dates to pre-computer days when writers and copy editors marked up document elements with copy editing symbols or shorthand.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for dynamically configuring a speech recognition portal, comprising:
   a) conducting a session with a user utilizing a speech recognition portal, wherein access to a network is provided during the session via the speech recognition portal;
   b) receiving utterances from the user during the session via the speech recognition portal;
   c) performing a speech recognition process on the utterances to interpret the utterances;
   d) dynamically configuring one or more aspects of the speech recognition portal during the session; and
   e) monitoring the speech recognition portal during the session to ascertain user preferences of the one or more aspects of the speech recognition portal, and storing the user preferences in a memory;
   f) wherein the user preferences are retrieved from the memory upon initiation of a subsequent session with the user utilizing the speech recognition portal, and wherein at least one aspect of the speech recognition portal is initially configured based on the retrieved user preferences;
   g) wherein the one or more aspects of the speech recognition portal are dynamically configured based on at least one of the interpreted utterances of the user;
   h) wherein the one or more aspects of the speech recognition portal are dynamically configured based on characteristics of the user;
   i) wherein the one or more aspects of the speech recognition portal include a set of applications presented in the speech recognition portal during the session;
   j) wherein the one or more aspects of the speech recognition portal include a set of commands available for use in the speech recognition portal;
   k) wherein the one or more aspects of the speech recognition portal include a set of verbal prompts used in the speech recognition portal;
   l) wherein at least one alarm is provided for notifications based on alarm conditions, the notifications being of a type chosen from the group consisting of: a simple network management protocol (SNMP) notification, a telephone notification, an electronic mail notification, a pager notification, a facsimile notification, a short message services (SMS) notification, and a wireless application protocol (WAP) push notification;
   m) wherein the at least one alarm is managed including integrating the at least one alarm with a helpdesk system;
   n) wherein a performance monitor provides a number of users simultaneously using at least one of the applications and an uptime of the speech recognition portal.

2. The method of claim 1, wherein the one or more aspects of the speech recognition portal are dynamicaliy configured based on a locale of the user.

3. The method of claim 2, wherein an order of the applications presented to the user is dynamically configured based on the locale of the user at the time of the session.

4. The method of claim 1, wherein the one or more aspects of the speech recognition portal are dynamically configured based on a credit card account number of the user.

5. The method of claim 1, wherein the one or more aspects of the speech recognition portal are dynamically configured based on stack purchases by the user.

6. The method of claim 1, further comprising dynamically configuring one or more back end processes in communication with the speech recognition portal via the network.

7. The method of claim 1, wherein information about a gender of the user is ascertained from the utterances, and wherein the one or more aspects of the speech recognition portal are dynamically configured based on the ascertained gender of the user.

8. The method of claim 7, wherein a first set of applications is presented to the user upon a determination that the user is male and a second set of applications is presented to the user upon a determination that the user is female.

9. The method of claim 8, wherein the determination is made utilizing automatic speech recognition (ASR) techniques capable of distinguishing the gender of the user based on at least one of a tone and a pitch of the utterances from the user.

10. The method of claim 1, wherein a profile is associated with the user, and wherein the one or more aspects of the speech recognition portal are dynamically configured upon change of the profile by a third party authorized to change the profile.

11. The method of claim 10, wherein a set of applications presented to the user are dynamically configured upon the change of the profile by the third party authorized to change the profile.

12. The method of claim 1, wherein a graphical interface is presented to the user utilizing the network during the session to allow the user to input information via the graphical interface, and wherein the one or more aspects of the speech recognition portal are dynamically configured based on the information input by the user via the graphical interface.

13. The method of clan 1, wherein a geographic locale of the user is provided by sending a request to a wireless carrier or a location network service provider and receiving a response from the wireless carrier or the location network service provider with a graphic locale of the user.

14. The method of claim 1, wherein the applications include a nationwide business finder application, a nationwide driving directions application, a worldwide flight information application, a nationwide traffic updates application, a worldwide weather application, a news application, a sports application, a stock quotes application, and an infotainment application.

15. A system for dynamically configuring a speech recognition portal, comprising:
  a) logic for conducting a session with a user utilizing a speech recognition portal, wherein access to a network is provided during the session via the speech recognition portal;
  b) logic for receiving utterances from the user during the session via the speech recognition portal;
  c) logic for performing, a speech recognition process on the utterances to interpret the utterances;
  d) Logic for dynamically configuring one or more aspects of the speech recognition portal during the session based on at least one of the interpreted utterances; and
  e) logic for monitoring the speech recognition portal during the session to ascertain user preferences of the one or more aspects of the speech recognition portal, and logic for storing the user preferences in a memory;
  f) wherein the user preferences are retrieved from the memory upon initiation of a subsequent session with the user utilizing the speech recognition portal, and wherein at least one aspect of the speech recognition portal is initially configured based on the retrieved user preferences;
  g) wherein the one or more aspects of the speech recognition portal are dynamically configured based on at least one of the interpreted utterances of the user;
  h) wherein the one or more aspects of the speech recognition portal are dynamically configured based on characteristics of the user;
  i) wherein the one or more aspects of the speech recognition portal include a set of applications presented in the speech recognition portal during the session;
  j) wherein the one or more aspects of the speech recognition portal include a set of commands available for use in the speech recognition portal;
  k) wherein the one or more aspects of the speech recognition portal include a set of verbal prompts used in the speech recognition portal;
  l) wherein at least one alarm is provided for notifications based on alarm conditions, the notifications being of a type chosen from the group consisting of: a simple network management protocol (SNMP) notification, a telephone notification, an electronic mail notification, a pager notification, a facsimile notification, a short message services (SMS) notification, and a wireless application protocol (WAP) push notification;
  m) wherein the at least one alarm is managed including integrating the at least one alarm with a helpdesk system;
  n) wherein a performance monitor provides a number of users simultaneously using at least one of the applications and an uptime of the speech recognition portal.

16. A computer program product for dynamically configuring a speech recognition portal, comprising:
  a) computer code for conducting a session with a user utilizing a speech recognition portal, wherein access to a network is provided during the session via the speech recognition portal;
  b) computer code for receiving utterances from the user during the session via the speech recognition portal; and
  c) computer code for performing a speech recognition process on the utterances to interpret the utterances;
  d) computer code for dynamically configuring one or more aspects of the speech recognition portal during the session based on at least one of the interpreted utterances; and
  e) computer code for monitoring the speech recognition portal during the session to ascertain user preferences of the one or more aspects of the speech recognition portal, and computer code for storing the user preferences in a memory;
  f) wherein the user preferences are retrieved from the memory upon initiation of a subsequent session with the user utilizing the speech recognition portal, and wherein at least one aspect of the speech recognition portal is initially configured based on the retrieved user preferences;
  g) wherein the one or more aspects of the speech recognition portal are dynamically configured based on at least one of the interpreted utterances of the user;
  h) wherein the one or more aspects of the speech recognition portal are dynamically configured based on characteristics of tile user;
  i) wherein the one or more aspects of the speech recognition portal include a set of applications presented in the speech recognition portal during the session;
  j) wherein the one or more aspects of the speech recognition portal include a set of commands available for use in the speech recognition portal;
  k) wherein the one or more aspects of the speech recognition portal include a set of verbal prompts used in the speech recognition portal;
  l) wherein at least one alarm is provided for notifications based on alarm conditions, the notifications being of a type chosen from the group consisting of: a simple network management protocol (SNMP) notification, a telephone notification, an electronic mail notification, a pager notification a facsimile notification, a short message services (SMS) notification, and a wireless application protocol (WAP) push notification;
  m) wherein a performance monitor provides a number of users simultaneously using at least one of the applications and an uptime of the speech recognition portal.

* * * * *